Feb. 2, 1954 H. E. TEMPLE 2,668,002
APPARATUS FOR REMOVING COVERS FROM BAKING PANS
Filed Oct. 30, 1950 5 Sheets-Sheet 2

INVENTOR:
HIRAM E. TEMPLE
BY HIS ATTORNEYS
HARRIS, KIECH, FOSTER & HARRIS

Feb. 2, 1954 H. E. TEMPLE 2,668,002
APPARATUS FOR REMOVING COVERS FROM BAKING PANS
Filed Oct. 30, 1950 5 Sheets-Sheet 4

INVENTOR:
HIRAM E. TEMPLE
BY HIS ATTORNEYS
HARRIS, KIECH, FOSTER & HARRIS

Feb. 2, 1954 H. E. TEMPLE 2,668,002
APPARATUS FOR REMOVING COVERS FROM BAKING PANS
Filed Oct. 30, 1950 5 Sheets-Sheet 5

INVENTOR:
HIRAM E. TEMPLE
BY HIS ATTORNEYS
HARRIS, KIECH, FOSTER & HARRIS

Patented Feb. 2, 1954

2,668,002

UNITED STATES PATENT OFFICE 2,668,002

APPARATUS FOR REMOVING COVERS FROM BAKING PANS

Hiram E. Temple, San Gabriel, Calif., assignor to Read Standard Corporation, a corporation of Delaware Application October 30, 1950, Serial No. 192,926

11 Claims. (Cl. 226—129)

The present invention relates in general to an apparatus for picking up and transporting articles from one location or zone to another and, since the invention has particular utility in the baking industry for removing the covers of pullman baking pans, it will be considered in such connection hereinafter as a matter of convenience.

In the baking industry, certain types of bread require covered or pullman baking pans, and in a typical bakery, the covered baking pans are delivered to the inlet end of an oven of the travelling type and are moved continuously therethrough as the loaves of bread in the pans are being baked. The pans are customarily arranged side by side in groups and are secured together in spaced relation by straps which encompass the respective groups, each such group being conventionally termed a pan strap. By the time the pan straps arrive at the outlet end of the travelling oven in such a typical bakery, the loaves of bread in the individual pans are baked and may be dumped therefrom in a dumping zone spaced from the outlet end of the oven, a primary object of the invention being to provide an apparatus for removing the covers from the baking pans which may be interposed between the outlet end of the oven and the dumping zone.

When the pan straps arrive at the dumping zone after the covers have been removed from the individual pans by the apparatus of the present invention, the loaves of bread may be dumped either manually or automatically.

Considering the present invention more specifically, an important object is to provide an apparatus which includes a structure having spaced loading and unloading zones, conveyor means for delivering the pan straps from the outlet end of an oven, or other source, to the loading zone, a carriage movable from the loading zone to the unloading zone, a plurality of pickups carried by the carriage and each adapted to engage the cover of one of the individual pans in the loading zone and to remove it from its pan in response to movement of the carriage from the loading zone toward the unloading zone, means for moving the carriage from the loading zone to the unloading zone so as to transport to the unloading zone any covers carried by the pickups and unloading means for releasing from the pickups in the unloading zone any covers carried thereby.

Another important object of the invention is to provide such an apparatus wherein the pickups for removing the covers from the individual pans are magnetic and are adapted to magnetically engage the covers so as to remove them upon movement of the carriage from the loading zone toward the unloading zone.

Still another important object of the present invention is to provide such an apparatus with gate means for intercepting and restraining the pan straps delivered to the loading zone until such time as a predetermined number of pan straps have been intercepted by the gate means, and to provide it with means for subsequently energizing the aforementioned means for moving the carriage from the loading zone to the unloading zone.

More particularly, an object of the invention is to provide an apparatus which includes a switch or switch means actuable by the gate means in response to the pressure of a predetermined number of pan straps thereagainst, and which includes an electric motor operatively connected to a carriage conveyor means for moving the carriage from the loading zone to the unloading zone, the switch or switch means being actuable by the gate means to energize the electric motor. A related object is to provide electrical means for retracting the gate means to permit the passage of the pan straps therepast after the covers have been removed from the individual pans, and to provide a switch or switch means actuable by the carriage conveyor means as it moves the carriage from the loading zone toward the unloading zone for energizing such electrical means to retract the gate means.

With this construction, when the gate means intercepts a predetermined number of pan straps, the electric motor for driving the carriage conveyor means is energized to cause the pickups to magnetically remove the covers from the individual pans for transport to the unloading zone, and thereafter the electrical means controlling the gate means is energized to retract the gate means so as to permit passage of the uncovered pans, which are important features of the present invention.

Another important object of the present invention is to provide an apparatus wherein the carriage conveyor means includes a pair of spaced, substantially parallel, endless, carriage conveyor elements extending between the loading and unloading zones and respectively disposed adjacent opposite sides of the conveyor for delivering the pan straps to the loading zone, and includes link elements pivotally connected to the carriage conveyor elements and to the pickup carriage for pivotally suspending the pickup carriage from the carriage conveyor elements, the pickup carriage extending across the conveyor which delivers the pan straps to the loading zone.

Another object is to provide guide means comprising a pair of carriage guide elements extending between the loading and unloading zones for guiding the pickup carriage along a predetermined path from the loading zone to the unloading zone.

An important object of the invention is to provide carriage conveyor elements which are adapted to move the pickup carriage generally vertically in the loading zone so that the pickups lift the covers from the individual pans, and to provide carriage guide elements which define substantially vertical guideways for guiding the pickup carriage substantially vertically in the loading zone.

Another object is to provide carriage conveyor elements which define generally L-shaped loops each having a leg which extends downwardly into the loading zone and each having another leg which extends laterally from said one leg thereof into the unloading zone.

Another important object of the invention is to provide an unloading means for disengaging the covers from the magnetic pickups which includes a plurality of unloading elements extending generally horizontally into the unloading zone, each pair of unloading elements being adapted to receive one of the pickups therebetween and to strip from such pickup a cover carried thereby. A related object is to provide carriage guide elements having upwardly extending portions in the unloading zone which are adapted to lift the carriage and the pickups vertically as the pickups are inserted between the paired unloading elements so as to strip the covers from the pickups.

Another object is to provide a conveyor below the unloading zone for transporting any covers released from the pickups.

The foregoing objects and advantages of the present invention, together with other objects and advantages thereof which will become apparent hereinafter, may be attained through the utilization of the exemplary embodiment of the invention which is illustrated in detail in the accompanying drawings and which is described in detail hereinafter. Referring to the drawings.

Figure 1:
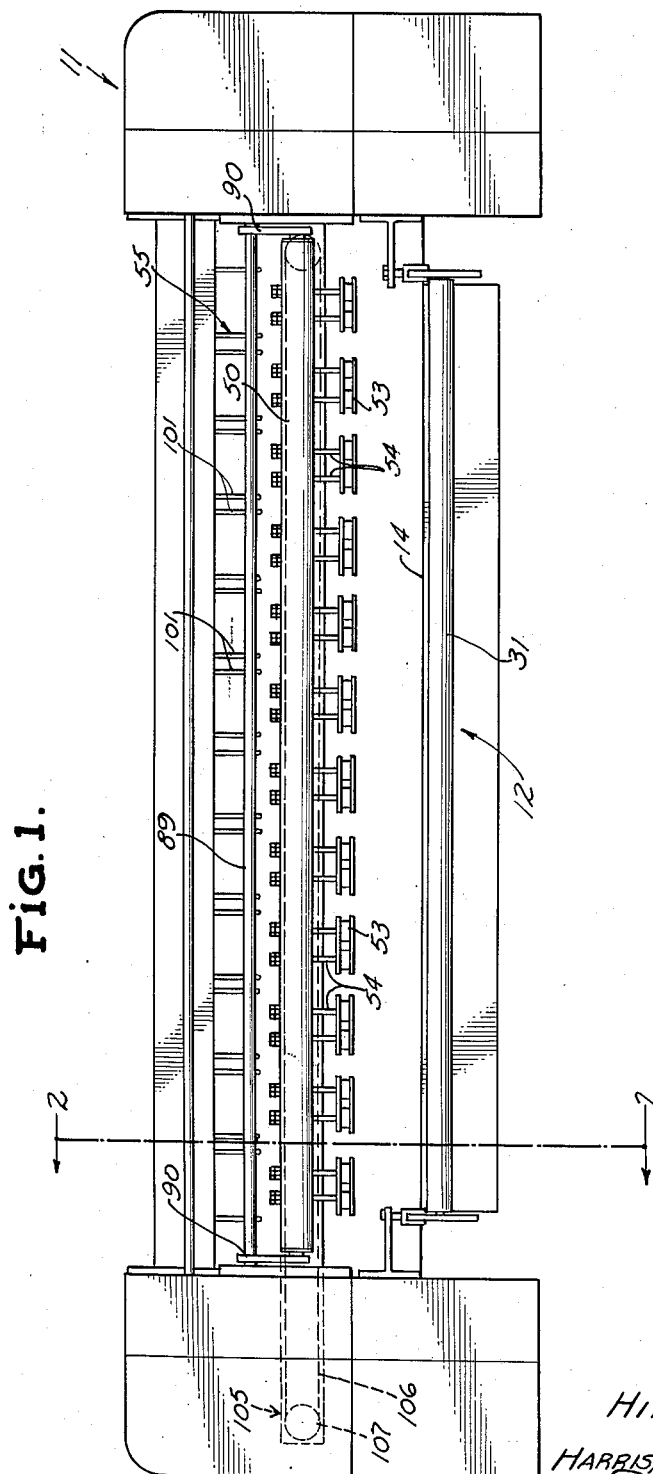
Fig. 1 is a front elevation of an apparatus embodying the present invention.
Figure 2:
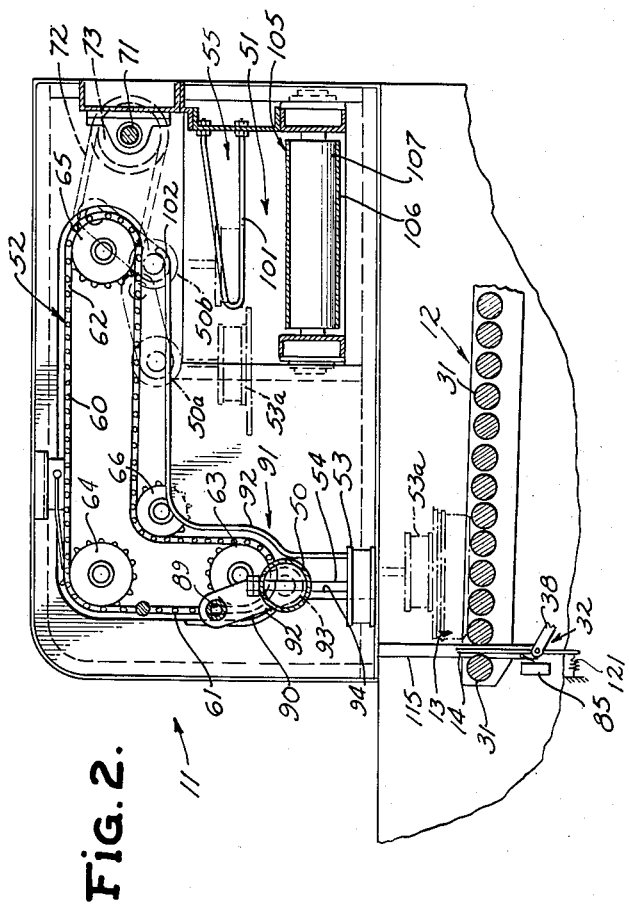
Fig. 2 is a longitudinal sectional view taken along the broken line 2—2 of Fig. 1.

Referring particularly to Figs. 1 and 2 of the drawings, the numeral 11 designates generally the apparatus of the present invention. As best shown in Fig. 2, the apparatus 11 includes a conveyor or conveyor means 12 for delivering pan straps emanating from an oven, or other source, not shown, to a loading zone 13 in which the covers are removed from the individual pans in a manner to be described in detail hereinafter. The conveyor 12 is desirably of sufficient width to enable it to convey two or more pan straps abreast and is preferably provided with means, not shown, for spacing apart successive ranks of pan straps in the direction of travel of the conveyor 12 as the ranks of pan straps approach the loading zone 13. Traversing the conveyor 12 on the downstream side of the loading zone 13 is a gate or gate means 14 which is adapted to intercept each rank of pan straps and to restrain it temporarily until the covers of the individual pans have been removed by the apparatus 11, the gate being adapted to actuate means for energizing the apparatus 11 whenever a rank of a predetermined number of pan straps bears thereagainst as will be discussed in more detail hereinafter. Thus, each rank of pan straps delivered to the loading zone 13 by the conveyor 12 is intercepted and temporarily restrained by the gate 14 until such time as the apparatus 11 removes the covers from the individual pans, the gate 14 thereafter being retracted to permit passage of the rank of pan straps.

Considering the apparatus 11 of the invention in more detail, the conveyor 12 may be of any desired construction and, in the particular construction illustrated, comprises a plurality of rollers 31 which convey the ranks of pan straps into the loading zone 13. The gate 14 is disposed between two of the rollers 31 and is movable generally vertically between an upper, extended position, not shown, and a lower, retracted position, the gate being adapted to intercept each rank of pan straps when it is in its extended position and to permit such rank to pass when in its retracted position. The gate 14 is movable between its extended and retracted positions by an actuating means 32, Figs. 3 and 7, which includes an electrical means 33, the latter being controlled by an element of a switch means 34 which, when actuated in a manner to be described hereinafter, energizes the electrical means 33 to cause the actuating means 32 to retract the gate, thereby permitting passage of a rank of pan straps. The electrical means 33 is illustrated as being an electric motor which drives a cam 37, preferably through reduction gearing, not shown. The cam 37 acts on an arm 38 on which the gate 14 is pivoted to extend and retract the gate once for each revolution of this cam. Driven by the motor 33 at the speed of the cam 37 is a cam 39 which operates a switch 40 controlling the motor 33. This switch is closed to energize the motor except when it engages a notch 41 in the cam 39. As will be discussed in detail in connection with Fig. 8, the switch means 34 and the switch 40 are so related that actuation of the switch means 34 starts the motor 33, whereupon the switch 40 takes over until the cams 37 and 39 have completed one revolution.

Continuing to consider the structural details of the apparatus 11, a carriage 50 traverses the conveyor 12 and is movable from the loading zone 13 to an unloading zone 51 by a carriage conveyor means 52, the carriage 50 being illustrated as a tube having a plurality of magnetic pickups 53 suspended therefrom by bolts 54. As best shown in Fig. 1, the pickups 53 are spaced apart transversely of the apparatus 11, i. e., along the carriage 50, the spacing of the pickups being substantially equal to the spacing of the individual pans in the ranks of pan straps delivered to the loading zone 13 so that the pickups will be aligned with the covers of the pans. As the carriage 50 is moved from the loading zone 13 to the unloading 51 by the carriage conveyor means 52, the pickups 53 transport any covers removed from pans thereby from the loading zone to the unloading zone, the covers being released from the pickups in the unloading zone by an unloading means 55 which strips the covers from the pickups in a manner to be described hereinafter.

Considering the carriage conveyor means 52 in more detail, it includes a pair of substantially parallel, flexible, endless, carriage conveyor elements respectively disposed adjacent opposite sides of the conveyor 12 and extending between the loading and unloading zones 13 and 51, such carriage conveyor elements being exemplified as chains 60 in the particular construction illustrated. As best shown in Fig. 2 of the drawings, each chain 60 defines a substantially L-shaped loop having a generally vertical leg which extends downwardly into the loading zone 13 and having a generally horizontal leg 62 which extends laterally from the generally vertical leg 61 thereof into the unloading zone 51. The L-shaped configuration of each chain 60 is maintained by training it over sprockets 63, 64, 65 and 66, each of these sprockets being mounted on a shaft which is, in turn, suitably mounted on the supporting structure or frame of the apparatus 11.

Figure 4:
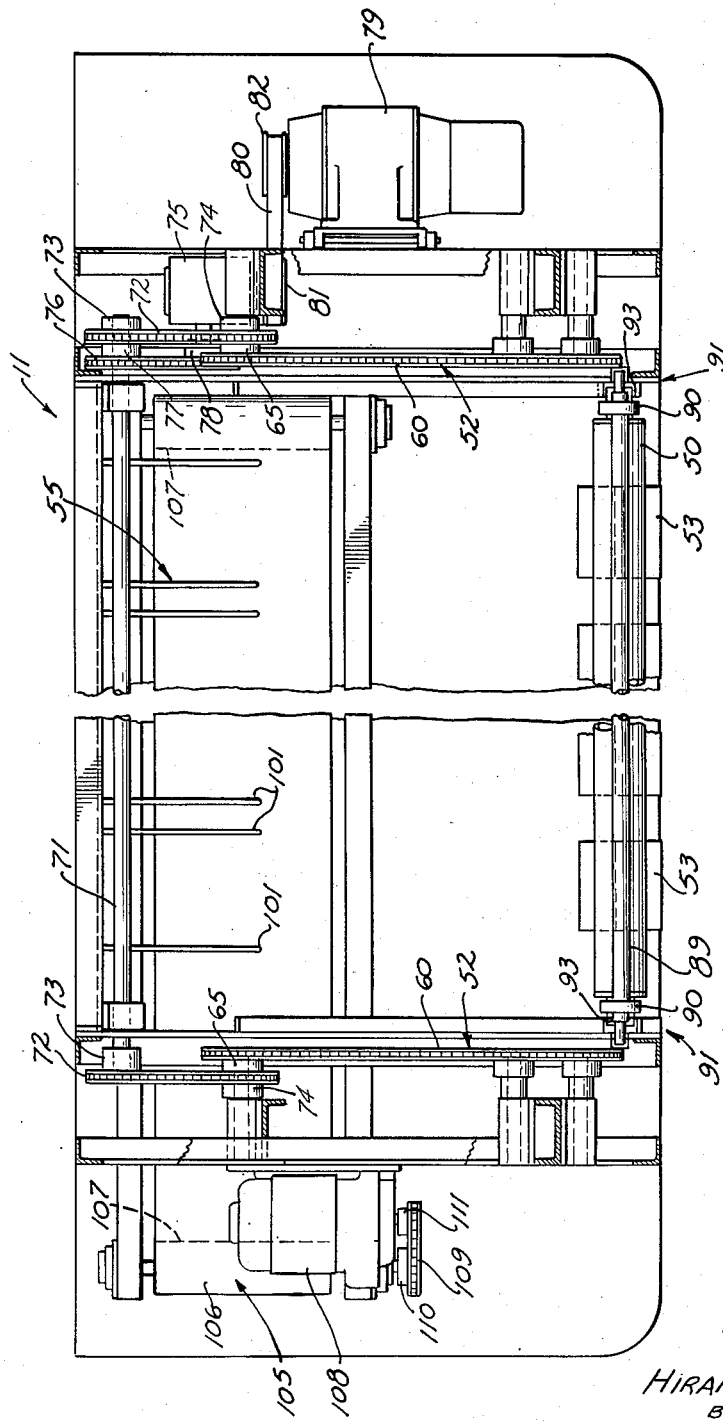
Fig. 4 is a plan view of the apparatus of the invention with housings thereof broken away to reveal structural details.
Figure 5:
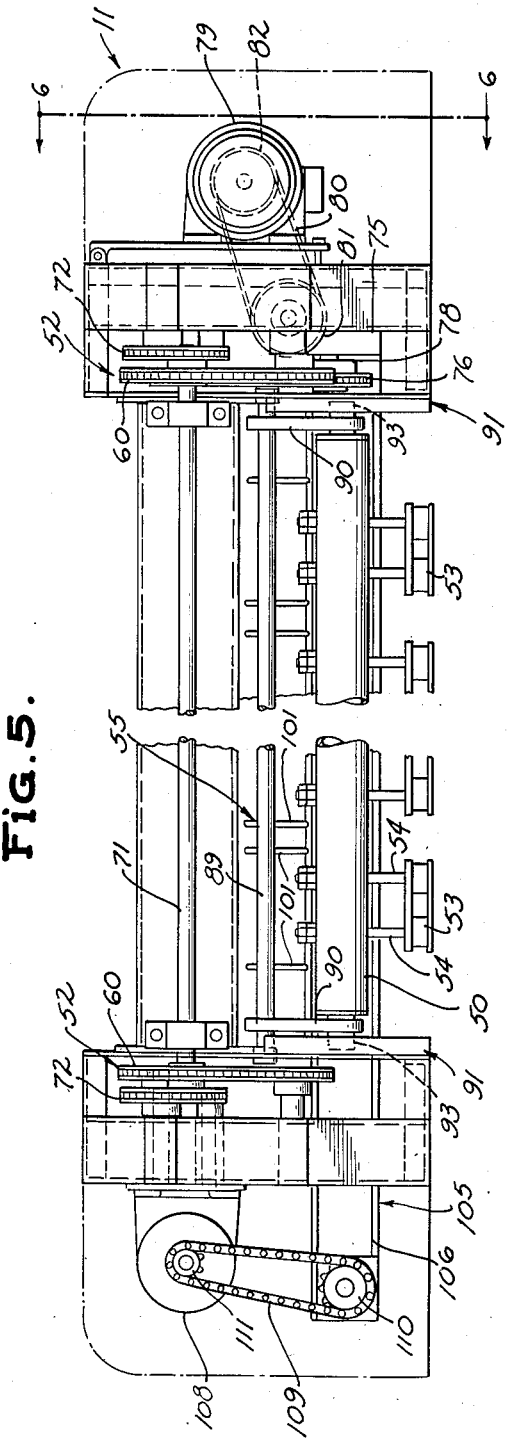
Fig. 5 is a front elevation of the apparatus of the invention with housings thereof broken away to reveal structural details.
Figure 6:
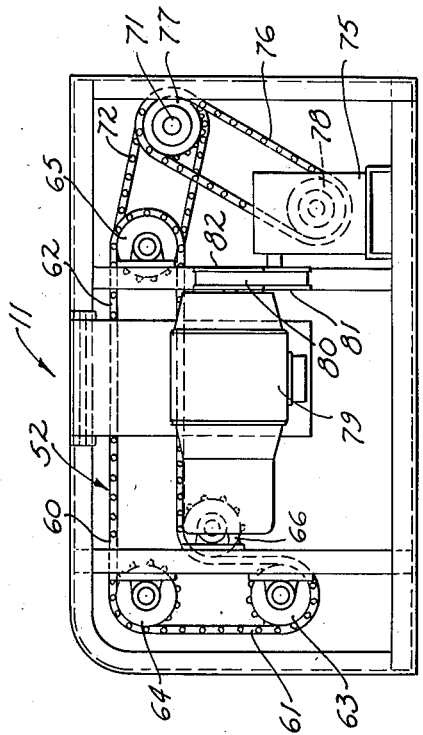
Fig. 6 is a longitudinal sectional view of the apparatus of the invention which is taken along the broken line 6—6 of Fig. 5.

Referring particularly to Figs. 4 to 6 of the drawings, the carriage conveyor chains 60 are driven by a transverse shaft 71 through chains 72 respectively trained around sprockets 73 on the shaft 71 and around sprockets 74. The latter are connected to the sprockets 65, respectively, around which the chains 60 are trained. Thus, the carriage conveyor chains 60 are driven in synchronism by the transverse shaft 71. The transverse shaft 71 is driven from a transmission 75, which may be a gear reduction unit, through a chain 76, Fig. 6, which is trained around a sprocket 77 on the shaft 71 and a sprocket 78 of the transmission 75. The transmission is driven by an electric motor 79 through a belt 80, Fig. 4, trained around a pulley 81 of the transmission 75 and a pulley 82 on the shaft of the motor 79. As will be discussed in more detail hereinafter, the motor 79 is controlled by a switch or switch means 85 which is closed by the gate 14 whenever a rank of a predetermined number of pan straps bears against the gate 14, the pressure of such a predetermined number of pan straps against the gate under the influence of the conveyor 12 being sufficient to actuate such switch to energize the motor 79.

The carriage 50 is pivotally suspended from a rod 89 carried by the two carriage conveyor chains 60 by two links 90 which are best shown in Fig. 5. Each of the links 90 is pivotally connected at one end to one of the carriage conveyor chains 60 and is pivotally connected at its other end to the corresponding end of the transversely extending carriage 50. Thus, with this construction, the carriage 50 is freely and pivotally suspended from the carriage conveyor chains 60 so that the magnetic pickups 53 carried by the carriage 50 are freely and pivotally suspended relative to the carriage conveyor chains, the action of gravity tending to maintain constant the orientation of the pickups.

In order to guide the carriage 50 along a predetermined path from the loading zone 13 to the unloading zone 51, the apparatus 11 includes carriage guide means 91 which includes two carriage guide elements 92 respectively disposed adjacent the ends of the carriage 50 and adjacent the carriage conveyor chains 60. As indicated in dotted lines in Figs. 2 and 5, the carriage 50 is provided at its ends with rollers 93, or other suitable elements, which engage the respective carriage guide elements 92 to guide the carriage 50 along the desired path from the loading zone 13 to the unloading zone 51. As best shown in Fig. 2, each carriage guide element is, in general, of approximately the same configuration as the carriage conveyor chains 60 so that the carriage is guided along a path which, in general, corresponds to the paths of the carriage conveyor chains. Considering the carriage guide elements 92 in more detail, each provides a generally vertical guideway 94 which extends generally vertically toward the loading zone 13 to guide the carriage 50 generally vertically downwardly into the loading zone and subsequently to guide the carriage generally vertically upwardly out of the loading zone, the carriage conveyor chains moving in the counterclockwise direction as viewed in Fig. 2. From the loading zone 13, the carriage 50 is guided to the unloading zone 51 by the carriage guide elements 92, successive positions of the carriage being designated by the reference characters 50a and 50b in Fig. 2.

Considering the unloading means 55, it includes a plurality of pairs of unloading elements or fingers 101 which are carried by the supporting structure or frame of the apparatus 11 and which extend generally horizontally into the unloading zone 51. As best shown in Fig. 5, each pair of unloading fingers 101 is aligned with a corresponding one of the pickups 53 so that each pickup is inserted between the unloading fingers of the corresponding pair as it passes through the unloading zone 51. As best shown in Fig. 2, the unloading fingers are so positioned that the lower face of each pickup is slightly below the unloading fingers as it is inserted between the unloading fingers of the corresponding pair. Continuing to refer to Fig. 2, when the carriage 50 reaches the position designated by the reference character 50b, the rollers 93 thereon encounter upwardly extending portions 102 of the carriage guide elements 92 so that the carriage 50 is caused to move upwardly after the pickups 53 have been inserted between the unloading fingers 101 of the corresponding pairs, such upward movement of the carriage being permitted by virtue of the pivotal connection of the links 90 to the carriage conveyor chains 60. As will be apparent, when the carriage 50 is moved upwardly by the upwardly extending portions 102 of the carriage guide elements 92 in this manner, the unloading fingers 101 strip from the pickups 53 any pan covers, or other articles, carried thereby, which is an important feature of the invention.

Thus, as will be apparent, for each complete operating cycle of the carriage 50, it moves downwardly into the loading zone 13 and upwardly out of the loading zone under the control of the guideways 94 provided by the carriage guide elements 92, moves laterally into the unloading zone 51 under the control of the carriage guide elements, and then moves upwardly under the control of the upwardly extending portions 102 of the carriage guide elements to strip the pan covers from the pickups 53, the carriage thereafter returning to its initial position. As will be discussed in more detail hereinafter, the carriage 50 comes to rest temporarily in its initial position, this being effected by a switch or switch means 103 which is actuable by an actuating element 104, Fig. 3, on one of the carriage conveyor chains 60 to de-energize the motor 79 when such actuating element is adjacent the position 104a.

The apparatus 11 includes a transverse conveyor 105 which, as best shown in Fig. 2, is located below the unloading zone 51 to receive the covers stripped from the pickups 53 by the unloading means 55. As best shown in Figs. 4 and 5, the cover conveyor 105 may include an endless belt 106 trained around rollers 107, one of the rollers 107 being driven by an electric motor 108 through a chain 109 trained around a sprocket 110 connected to such roller and a sprocket 111 connected to the motor shaft.

Figure 3:
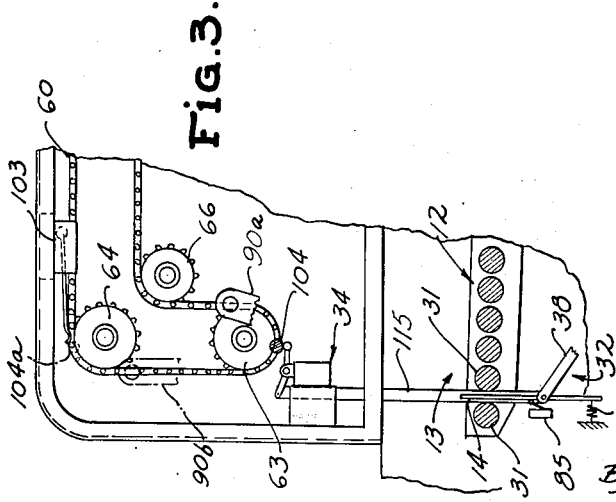
Fig. 3 is a fragmentary sectional view duplicating a portion of Fig. 2 but showing other operating positions for various elements of the apparatus of the invention.
Figure 8:
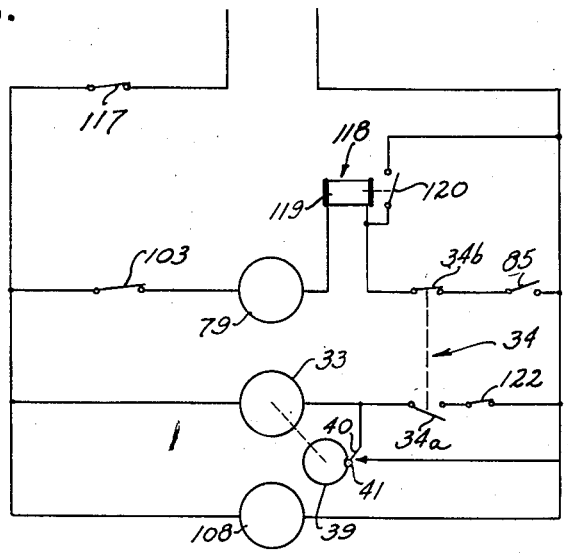
Fig. 8 is a diagrammatic view of the electrical circuit of the apparatus.

Referring now to Fig. 8 of the drawings, it will be noted that the switch means 34 is illustrated as comprising ganged switches 34a and 34b. The switch means 34 is actuable by the actuating element 104 on one of the carriage conveyor chains 60, the actuating element 104 being so positioned that, as best shown in Fig. 3, it actuates the switch means 34 when the links 90 connecting the carriage 50 to the carriage conveyor chains 60 attain a position, designated by the reference character 90a in Fig. 3, such that the magnetic pickups 53 have removed the covers from the pans. When the switch means 34 is so actuated by the actuating element 104, the switch 34a is closed and the switch 34b is opened.

The switch means 34 is, as best shown in Fig. 3, also controlled by the gate 14 through a link 115 connecting the switch means 34 to the gate. When the gate 14 is retracted, it acts through the link 115 to open the switch 34a and to close the switch 34b. Thus, during each operating cycle of the apparatus 11, the actuating element 104 on one of the carriage conveyor chains 60 closes the switch 34a and opens the switch 34b after the covers have been removed from the pans, and subsequently, the gate 14 opens the switch 34a and closes the switch 34b as the gate moves into its retracted position.

Heretofore, the mechanical elements of the apparatus 11 have been considered in detail while the electrical elements thereof have been considered only in a general way and in terms of their functions without any attempt to interrelate such electrical elements. Considering now the electrical circuit of the apparatus 11 with reference to Fig. 8 of the drawings, it will be noted that the motor 79 for driving the carriage 50, the motor 33 for operating the gate 14 and the motor 108 for driving the cover conveyor 105 are connected in parallel in a circuit which may be connected to any suitable current source through a main switch 117. Connected in series with the carriage motor 79 are the switch 103 for stopping the carriage in its rest position, the switch 34b of the switch means 34, and the switch 85 which is adapted to be closed by the gate 14 in response to the pressure of a rank of a predetermined number of pan straps against the gate. Associataed with the carriage motor 79 is a holding relay 118 which comprises a solenoid 119 connected in series with the carriage motor and in series with the switches 34b and 85. The solenoid 119, when energized, is adapted to close a switch 120 which is connected in series with the carriage motor 79 and the solenoid 119, but in parallel with the switches 34b and 85, to provide an alternate current path through the carriage motor, as will be discussed in more detail hereinafter.

Connected in series with the gate motor 33 are the switches 34a and 40, the latter being connected in parallel with respect to each other so as to provide alternate current paths through the gate motor. The cover conveyor motor 108 is controlled only by the main switch 117, the latter, when opened, acting to de-energize the entire apparatus 11.

Considering now the operation of the apparatus 11 with particular reference to the electrical circuit of Fig. 8 of the drawings, the various elements of the circuit occupy the positions shown in Fig. 8 when the apparatus 11 is at rest. In other words, the main switch 117 may be closed, the switches 103 and 34b associated with the carriage motor 79 are closed and the switches 85 and 120 associated therewith are open so that the carriage motor is de-energized, and the switches 34a and 40 associated with the gate motor 33 are open so that the gate motor is de-energized. The cover conveyor motor 108 will, of course, be energized as long as the main switch 117 is closed.

Figure 7:
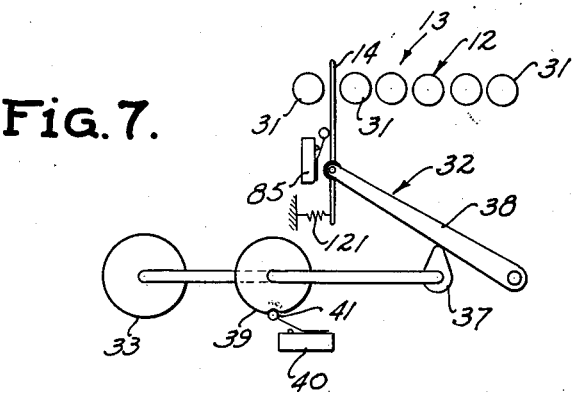
Fig. 7 is a semidiagrammatic view of a gate actuating means incorporated in the apparatus of the invention.

With the foregoing conditions obtaining, it will be assumed that the conveyor 12 delivers into the loading zone 13 a rank of pan straps sufficient in number to actuate the switch 85 when such pan straps are pressed against the gate 14 under the influence of the conveyor 12. As indicated in Figs. 3 and 7, the pivoted gate 14 is normally biased away from the switch 85 by a spring 121. Since, as indicated above, the switches 103 and 34b are closed prior to initiation of the operation of the apparatus 11, closure of the switch 85 by the gate 14 in response to the pressure of a predetermined number of pan straps against the gate results in energization of the carriage motor 79 and the solenoids 119 of the holding relay 118. Consequently, the carriage motor 79 starts the carriage on its way toward the loading zone 13, the carriage motor remaining energized, because of the action of the holding relay 118, as long as the switch 103 is closed.

Referring now to Fig. 2 of the drawings, the carriage motor 79 moves the carriage 50 into the loading zone 13, the carriage being guided vertically into the loading zone by the guideway 94 provided by the carriage guide elements 92. Thus, when the carriage 50 has been moved into the loading zone 13 to an extent sufficient to move the magnetic pickups into the positions indicated by the reference character 53a in Fig. 2, the pickups engage the covers of the individual pans in the rank of pan straps pressing against the gate 14. Subsequently, the carriage motor 79, acting through the carriage conveyor means 52, moves the carriage 50 upwardly out of the loading zone 13 and toward the unloading zone 51, the carriage being guided upwardly out of the loading zone by the guideway 94. Thus, the magnetic pickups 53 remove the covers from the pans in the loading zone 13 and move them toward the unloading zone 51.

After the covers have been removed from the pans in the foregoing manner, the actuating element 104 on one of the carriage conveyor chains 60 actuates the switch means 34 to close the switch 34a and open the switch 34b. It will be noted that, because of the action of the holding relay 118, opening of the switch 34b in this manner does not interrupt the flow of current to the carriage motor 79 so that the carriage 50 continues on its way toward the unloading zone 51. However, closure of the switch 34a by the actuating element 104 energizes the gate motor 33 to rotate the cam 37 into such a position that the gate 14 moves into its retracted position. As the gate 14 is moved into its retracted position in this manner, the gate, acting through the link 115 connecting it to the switch means 34, closes the switch 34b again and opens the switch 34a. However, by this time, the switch 40 has disengaged the notch 41 in the cam 39 and is closed by the cam 39 to provide an alternate current path through the gate motor 33. Thus, the gate motor continues to operate until the cams 37 and 39 have been rotated through one revolution, whereupon the switch 40 re-engages the notch 41 in the cam 39 to de-energize the gate motor. Thus, with this arrangement, the gate motor 33 is energized to retract and subsequently extend the gate 14, the gate motor being de-energized as soon as it has accomplished this. The speed of the cam 37 is such that it retracts the gate 14 for a period of time sufficient only to permit one rank of pan straps to move therepast, the gate 14 being returned to its extended position to intercept a succeeding rank of pan straps.

When the carriage 50 reaches the unloading zone 51, the covers carried by the magnetic pickups 53 are stripped therefrom by the unloading fingers 101 in the manner hereinbefore discussed, the covers dropping onto the cover conveyor 105 which conveys them to a suitable point of disposal.

After the covers have been stripped from the magnetic pickups 53 by the unloading fingers 101 in the foregoing manner, the carriage motor 79 continues to drive the carriage 50 until the carriage reaches its rest position. The rest position of the carriage 50 is the position occupied thereby when the links 90 pivotally supporting the carriage reach the position indicated by the reference character 90b in Fig. 3 of the drawings. As the carriage approaches its rest position, the actuating element 104 carried by one of the carriage conveyor chains 60 opens the switch 103 momentarily to de-energize the carriage motor 79 and the solenoid 119 of the holding relay 118. Consequently, the apparatus 11 remains at rest until such time as the switch 85 is again closed by the pressure of a rank of predetermined number of pan straps against the gate 14. If the required number of pan straps are pressing against the gate 14 when the carriage 50 reaches its rest position, the carriage motor 79 is, of course, immediately re-energized. In either event, the foregoing cycle of events is repeated to remove the covers from the next rank of pan straps.

It will be noted that the carriage motor cannot be energized unless the switch 34b is closed, this switch being opened by the actuating element 104 on one of the carriage conveyor chains 60 and being closed again by the gate 14 as the latter moves into its retracted position. Thus, if the gate 14 is not retracted for any reason upon closure of the switch 34a, the carriage motor 79 cannot be re-energized after the apparatus 11 is brought to rest by opening of the switch 103. Consequently, the switch 34b acts to prevent repeated passes of the magnetic pickups 53 at a rank of pan straps pressing against the gate 14 after once having removed the covers therefrom. This is a particularly important feature of the invention in an installation wherein the operation of the gate 14 may also depend upon the operation of another element of the installation. In such an installation, another switch 122 might be connected in series with the gate motor 33 and be controlled by an element controlling the operation of the gate.

Although I have disclosed an exemplary embodiment of my invention herein, it will be understood that various changes, modifications and substitutions may be incorporated in such embodiment without departing from the spirit of the invention.

I claim as my invention:

1. In an apparatus for picking up and transporting such articles as covers of baking pans, the combination of: a structure providing spaced loading and unloading zones, said loading zone being adapted to receive one or more baking pans having thereon covers which are to be removed; conveyor means for conveying baking pans to said loading zone; a gate traversing said conveyor means and movable relative thereto between extended and retracted positions, being adapted to intercept and restrain baking pans conveyed to said loading zone by said conveyor means; a carriage movable from said loading zone to said unloading zone; a plurality of pickups carried by said carriage, each of said pickups being adapted to engage a cover of a baking pan in said loading zone and to remove it therefrom in response to movement of said carriage from said loading zone to said unloading zone; means actuable by said gate and responsive to the pressure of a predetermined number of baking pans thereagainst for moving said carriage from said loading zone to said unloading zone so as to transport to said unloading zone any covers carried by said pickups; and unloading means for releasing from said pickups in said unloading zone any covers carried thereby.

2. In an apparatus for picking up and transporting such articles as covers of baking pans, the combination of: a structure providing spaced loading and unloading zones, said loading zone being adapted to receive one or more baking pans having thereon covers which are to be removed; conveyor means for conveying baking pans to said loading zone; a gate traversing said conveyor means and movable relative thereto between extended and retracted positions, said gate when in extended position, being adapted to intercept and restrain baking pans conveyed to said loading zone by said conveyor means; a carriage movable from said loading zone to said unloading zone; a plurality of magnetic pickups carried by said carriage, each of said pickups being adapted to magnetically engage a cover of a baking pan in said loading zone and to remove it from said pan in response to movement of said carriage from said loading zone to said unloading zone; means actuable by said gate and responsive to bearing thereagainst of a predetermined number of baking pans for moving said carriage from said loading zone to said unloading zone so as to transport to said unloading zone any covers carried by said pickups; and unloading means in said unloading zone and engageable with any covers carried by said pickups for disengaging such covers therefrom.

3. An apparatus as defined in claim 2 wherein said unloading means comprises a plurality of unloading elements each pair of which is adapted to receive one of said pickups therebetween and to strip from such pickup a cover carried thereby.

4. In an apparatus for picking up and transporting such articles as covers of baking pans, the combination of: a structure providing spaced loading and unloading zones, said loading zone being adapted to receive one or more baking pans having thereon covers which are to be removed; conveyor means for conveying baking pans to said loading zone; a gate traversing said conveyor means and movable relative thereto between extended and retracted positions, said gate when in said extended position, being adapted to intercept and restrain baking pans conveyed to said loading zone by said conveyor means; a carriage movable from said loading zone to said unloading zone; a plurality of pickups carried by said carriage; each of said pickups being adapted to engage a cover of a baking pan restrained in said loading zone by said gate and to remove such cover therefrom in response to movement of said carriage from said loading zone to said unloading zone; means, including an electric motor, for moving said carriage from said loading zone to said unloading zone so as to transport to said unloading zone any covers carried by said pickups; means for energizing said electric motor, including switch means actuable by said gate in response to the pressure of a predetermined number of baking pans thereagainst; and unloading means for releasing from said pickups in said unloading zone any covers carried thereby.

5. An apparatus according to claim 4 wherein said means for moving said carriage from said loading zone to said unloading zone includes carriage conveyor means, said carriage being connected to said carriage conveyor means and said carriage conveyor means being operatively connected to said electric motor.

6. An apparatus as defined in claim 5 having: means, including electrical means, for moving said gate from its extended position to its retracted position; means, including another switch means, for energizing said electrical means; and means on said carriage conveyor means and spaced from said carriage for actuating said other switch means to retract said gate when said carriage arrives in a position intermediate said loading and unloading zones.

7. In an apparatus for picking up and transporting such articles as covers of baking pans, the combination of: a structure providing spaced loading and unloading zones, said loading zone being adapted to receive one or more baking pans having thereon covers which are to be removed; conveyor means carried by said structure for conveying one or more baking pans to said loading zone; a gate traversing said conveyor means and movable between extended and retracted positions, said gate, when in its extended position, being adapted to intercept baking pans conveyed to said loading zone by said conveyor means; a pair of endless, carriage conveyor elements disposed adjacent opposite sides of said conveyor means and extending between said loading and unloading zones; a carriage traversing said conveyor means and carried by said carriage conveyor elements, said carriage conveyor elements being adapted to move said carriage from said loading zone to said unloading zone; a plurality of pickups carried by said carriage; each of said pickups being adapted to engage a cover of a baking pan in said loading zone and to remove it from said pan in response to movement of said carriage from said loading zone to said unloading zone; an electric motor operatively connected to said carriage conveyor elements for driving same to move said carriage from said loading zone to said unloading zone so as to transport to said unloading zone any covers carried by said pickups; means for energizing said electric motor, including a switch actuable by said gate in response to the pressure of a predetermined number of baking pans thereagainst; means, including electrical means, for moving said gate from its extended position to its retracted position; means for energizing said electrical means, including switch means and including means on one of said carriage conveyor elements and spaced from said carriage for actuating said switch means; and unloading means for releasing from said pickups in said unloading zone any covers carried thereby.

8. An apparatus according to claim 7 wherein said pickups are magnetic and wherein said unloading means includes a plurality of unloading elements each pair of which is adapted to receive one of said pickups therebetween to strip from said pickups any cover carried thereby.

9. In an apparatus for picking up and transporting such articles as covers for baking pans, the combination of: a structure providing spaced loading and unloading zones, said loading zone being adapted to receive one or more baking pans having thereon covers which are to be removed; a pair of spaced, substantially parallel, endless, carriage conveyor elements extending between said loading and unloading zones, each of said carriage conveyor elements defining a substantially L-shaped loop, one leg of which is generally vertical and extends downwardly into said loading zone and the other leg of which extends generally horizontally from said one leg into said unloading zone; a carriage extending between and pivotally connected to said carriage conveyor elements; a plurality of magnetic pickups carried by and depending from said carriage, each of said pickups being adapted to engage a cover of a baking pan in said loading zone and to remove it from said pan in response to movement of said carriage from said loading zone toward said unloading zone by said carriage conveyor elements; means for driving said carriage conveyor elements so as to move said carriage from said loading zone to said unloading zone, whereby to transport to said unloading zone any covers carried by said pickups; unloading means for releasing from said pickups in said unloading zone any covers carried thereby, said unloading means including a plurality of unloading elements which extend into said unloading zone and each pair of which is adapted to receive one of said pickups therebetween and to strip therefrom any cover carried thereby; and a pair of carriage guide elements which extend between said loading and unloading zones and said carriage having thereon elements which are engageable with said carriage guide elements, respectively, to guide said carriage along said carriage guide elements from said loading zone to said unloading zone, said carriage guide elements having upwardly extending portions in said unloading zone which are adapted to lift said carriage and said pickups vertically so as to cause said unloading elements to strip from said pickups any covers carried thereby.

10. An apparatus as defined in claim 1 including a conveyor below said unloading zone for transporting from said unloading zone any covers released from said pickups therein.

11. In an apparatus for picking up and transporting such articles as covers of baking pans, the combination of: a structure providing spaced loading and unloading zones, conveyor means extending through said loading zone for conveying to said loading zone baking pans having covers thereon and for conveying from said loading zone baking pans from which covers have been removed, a gate in said loading zone traversing said conveyor means movable between extended and retracted positions, said gate, when in its extended position, being adapted to intercept baking pans with covers thereon conveyed to said loading zone by said conveyor means, said gate, when in its retracted position, being adapted to permit pans from which covers have been removed to be conveyed from said loading zone by said conveyor means; a carriage movable from said loading zone to said unloading zone; a plurality of pickups carried by said carriage, each of said pickups being adapted to engage a cover of a baking pan in said loading zone and to remove it therefrom in response to movement of said carriage from said loading zone to said unloading zone; means actuable by said gate and responsive to bearing thereagainst of a predetermined number of baking pans for moving said carriage from said loading zone to said unloading zone so as to transport to said unloading zone any covers carried by said pickups; actuating means for effecting a cycle of movement of said gate from an extended to a retracted and back to an extended position; and means associated with said carriage for initiating operation of said actuating means to move said gate through said cycle of movement succeeding each operation of said pickup means.

HIRAM E. TEMPLE.

References Cited in the file of this patent

UNITED STATES PATENTS

| Number | Name | Date |
|---|---|---|
| 612,375 | Bennett | Oct. 11, 1898 |
| 1,742,074 | Hires | Dec. 31, 1929 |
| 1,788,228 | Berkenvelder | Jan. 6, 1931 |
| 1,854,551 | Kronborg et al. | Apr. 19, 1932 |
| 1,889,065 | Gentil | Nov. 29, 1932 |
| 1,907,458 | Stevenson | May 9, 1933 |
| 2,143,026 | Nordquist | Jan. 10, 1939 |
| 2,213,774 | Taylor | Sept. 3, 1940 |
| 2,222,745 | Heidelmeyer | Nov. 26, 1940 |
| 2,462,021 | Harker | Feb. 15, 1949 |
| 2,470,795 | Socke | May 24, 1949 |